Patented Sept. 26, 1944

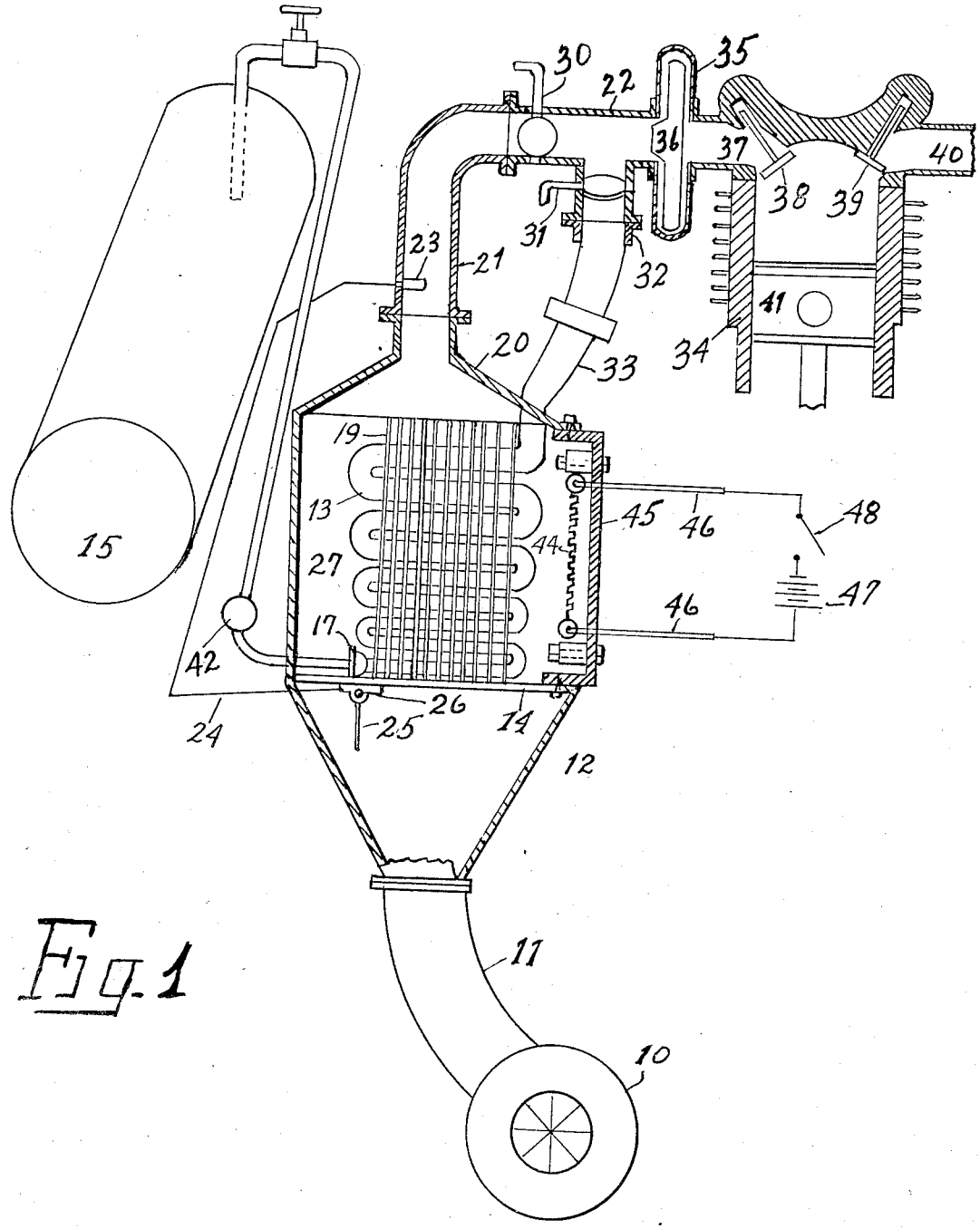

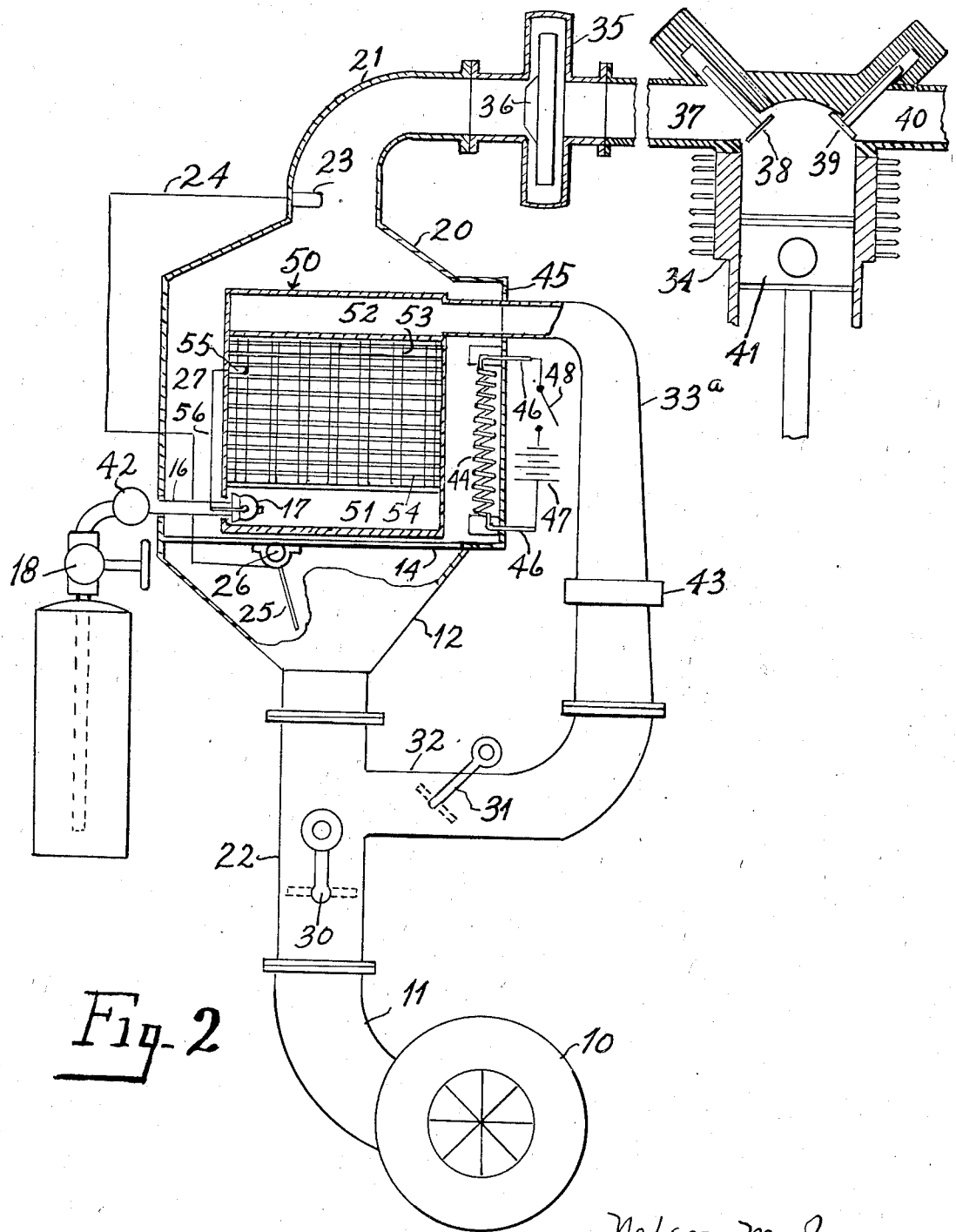

2,359,219

UNITED STATES PATENT OFFICE 2,359,219

MEANS FOR USING LIQUEFIED PETROLEUM GASES FOR ENGINE FUEL

Nelson M. Jones, Sarasota, Fla., assignor to Green's Fuel, Incorporated, Sarasota, Fla., a corporation of Florida Application March 26, 1943, Serial No. 480,661

15 Claims. (Cl. 123—133)

This invention relates to a method and means for using liquid hydro-carbon gases such as propane, butane, and the like as a fuel for internal combustion engines. As is well known, these liquefied petroleum gases are handled from point of production to point of consumption in closed containers of pressure vessel type, such liquefied petroleum gases having an inherent vapor pressure dependent on temperature variations above or below their natural boiling points. It is generally liquefied by compressing the gases, and the liquid is stored in such tanks, being usually transferred to smaller, unvented containers for use. It is liquefied by compression, and stored in tanks and is usually transferred to smaller containers for use. When the liquefied petroleum gases are allowed to escape from the containers into substantially atmospheric pressure, it will expand into a gaseous form provided such temperature is above the normal boiling point of the liquid. In expanding into a gaseous form, a great amount of heat is absorbed in the expansion process, and it is an object of this invention to employ this heat absorption principle or refrigeration effect for useful purposes in internal combustion engines. The invention is especially adaptable for use in aircraft, because the liquefied petroleum gas being stored in a suitable compression tank in the aircraft is not subjected to variations in altitude as is the case in ordinary gasoline. The invention is especially adaptable for use in internal combustion engines used in aircraft at high altitudes where a supercharger is employed together with a conventional blower for forcing air under sufficient pressure into the carburetor or mixing valve due to the rarity of the atmosphere at high altitudes. When such supercharger is employed, in many instances, the air is often heated to a temperature from 400° to 500° Fahrenheit, and by using the refrigeration or heat absorption effect of the expansion of the liquefied gas into a vapor, this air heated by the supercharger can be sufficiently cooled before it enters the engine, so as to greatly increase the volumetric efficiency of the engine.

It is an object of this invention to provide a method and means for using liquefied hydro-carbon gas such as propane, butane, and the like, as well as combinations of these liquefied gases with other hydrocarbons as a fuel for internal combustion engines.

Some of the objects of the invention having been stated, other objects will appear as the description proceeds when taken in connection with the accompanying drawings, in which:

Figure 1 is a schematic sectional view showing the invention associated with one of the cylinders of an internal combustion engine;

Figure 2 is a view similar to Figure 1, but showing a different arrangement of the mixing valve and heat exchanging mechanism.

The drawings are largely schematic and show the invention in connection with one cylinder of an internal combustion engine. It is, of course, evident that the average aircraft engine has a plurality of cylinders and the fuel mixture is usually led through a blower which is an integral part of the engine, and from the blower into an intake manifold, from which a separate intake pipe leads to each cylinder.

One form of the invention which is shown schematically and not according to scale in Figure 1, there is a supercharger 10 which is of conventional make, and from this supercharger a duct 11 leads to the lower end of a housing 12, having therein a suitable expansion coil 13, which is shown as having gradually enlarged tubing from the point of entrance of the liquefied petroleum gas to its point of exit. This form of the invention is preferable though not necessary. In the drawings, there is shown one coil extending from bottom to top, but, of course, it is evident that any number of such coils could be provided to take care of the vaporization of sufficient fuel as needed, depending upon the capacity of the internal combustion engine. This expansion coil 13 is supported by a member 14 which leaves a major portion of the bottom of the housing 12 open to allow the flow of air from the supercharger through the housing past the expansion coils 13.

The liquefied petroleum gas is contained in a suitable pressure tank 15, and from this tank a pipe 16 is led into the housing where a suitable conventional expansion valve 17 is provided. A suitable valve 18 is provided for cutting on and off the flow of liquefied fuel to the evaporator or expansion coil.

The expansion coil is preferably finned, as at 19, there being any desired number of fins to assist in the heat absorption qualities of the evaporator coil.

The housing 12 is restricted as at 20 at its top portion, and has connected thereto a suitable connecting pipe 21, which, in turn, is connected to a mixing valve casing 22. Disposed within the pipe 21 is a suitable thermostat 23 which is connected by conventional means 24 to operating mechanism, not shown, for a vane 25 which is pivoted as at 26 and this vane is adapted to control the amount of air passing through and in contact with the evaporator or expansion coil 12 and the amount which may be by-passed through portion 27 of the housing. The temperature of the air passing member 23 will control the position of the vane 25 thereby regulating the portion of the air entering the housing 12 which passes in contact with the expansion coil and the portion which passes through passageway 27.

The expansion valve 17 is preferably located in the housing in the line of draft of the air which is being forced from the supercharger to the engine. The expansion mechanism can be of any suitable type such as a continuous coil. If desired, instead of using a coil, a header type of evaporator can be employed, which is shown in Figure 2, and which will be later described.

The mixing valve 22 is of conventional structure and has generally speaking a valve 30 for controlling the air entering the mixing valve, and has a valve 31 disposed in a branch 32 for controlling the amount of vapor or fuel entering the mixing valve. These valves 30 and 31 are suitably controlled for delivering the proper amount of air and vapor to the engine. The upper end of the coil 13 is connected by a suitable pipe 33 to the branch 32 of the mixing valve. In larger types of radial and other aircraft engines, there is usually employed a blower which is built into the engine. This is schematically shown as comprising a housing 35 having a blower 36 therein, which is driven by any suitable means such as being geared to the internal mechanism of the engine. This gearing arrangement is not shown as it is conventional. The blower is usually connected to an intake manifold, not shown, and from this intake manifold a separate intake duct 37 leads to each individual cylinder 34 where it enters by way of the intake valve 38, and after being ignited and performing its work, is expelled through exhaust valve 39 and into exhaust duct 40. A piston 41 is shown in the cylinder 34.

In practice in aircraft, the heat exchanger and the mixing valve would be disposed in close proximity to each other and also in close proximity to the blower by preferably placing the entire mechanism behind the bank of cylinders, and also providing a very short vapor line between the heat exchanger or evaporator mechanism and the mixing valve. It is preferable to employ in the vapor line between the evaporator and the mixing valve a suitable conventional pressure regulator 43 for controlling the pressure at which the vapor enters the mixing valve. This pressure regulator or pressure reducing valve 43 is of conventional structure such as used in stationary installation where liquefied petroleum gases are used for domestic purposes such as heating, cooking, and the like.

Liquefied petroleum gases, such as butane, propane, and the like usually remain liquid until subjected to 30° to 33° Fahrenheit temperature or above, and in this liquid condition, no pressure except head pressure or gravity pressure is exerted by the liquid. In aircraft installation, especially, it is evident that quite often, and especially at high altitudes, the temperature would be below the required minimum for creating vaporization of the liquid in the tank for creating the pressure necessary for forcing the liquid into the expansion valve; therefore, it is preferable to employ a suitable liquid fuel pump 42 for moving the liquid from the tank 16 through the expansion valve regardless of the vapor pressure in the tank 16 produced by the atmospheric temperature surrounding the tank 16.

It is noted in Figure 1 that where the evaporator is in the form of a continuous coil or a plurality of continuous coils connected together, it would be preferably made of a continuously enlarging diameter, either by a gradually expanding of the diameter of the tube, or by succeeding sections of the coil between the expansion valve and the point of exit of the vapor being gradually stepped up as to size to produce the necessary expansion space within the evaporator. The pipe 33 disposed between the exit portion of the evaporator and the mixing valve would preferably be of a gradually enlarging size, and also of very short length to prevent recondensation of the vapor after it is vaporized and before it reaches the mixing valve.

It is evident that even with the use of a supercharger, which has been previously pointed out, heats the air being forced into the engine, that at extremely low temperatures and with vane 25 closing duct 27, there might not be sufficient heat transfer for the proper vaporization of the liquid in the evaporator coils 13. It is also evident that in starting a cold engine, that suitable heating means should be employed to assist in the vaporization of the liquid.

Also in operation in the air without a supercharger, where the suction of the engine or the blower would be depended upon to draw the air through the evaporator, the evaporator coils should be heated. I have shown a heating means comprising a heating coil 44 disposed within a door or cover 45 suitably connected to the housing. This heating coil 44 is connected by wires 46 to a battery 47 with a suitable switch 48 therein for energizing the heating coil when desired. This heating coil is in close proximity to the coils of the evaporator, and the battery employed is usually the conventional aircraft battery. By turning on the electric heater, for initially heating the evaporator mechanism, a sufficient amount of vapor will be supplied to the mixing valve. This electric heating coil could be employed continuously in flying in cold temperatures, but it usually would be employed only in preparing the engine for starting when cold, and until the supercharger has heated the air passing through the coils to the proper temperature.

In Figure 2 another form of the invention is shown which is similar in all respects to the mechanism shown in Figure 1, except that instead of having the heat exchanger or expansion coil in advance of the mixing valve, it is placed between the mixing valve and the engine so that the mixture of vapor and air is cooled by the evaporation process instead of just cooling the air alone as in Figure 1.

The mechanism shown in Figure 2 is very similar to the mechanism shown in Figure 1, and like reference characters will apply to like parts, and only a description will be given of the portions of Figure 2 which differ in structure from the counterparts of Figure 1.

Instead of having a continuous coil or a plurality of interconnected continuous coils for the evaporator or heat exchanger, I may employ a different type of evaporator. This type of evaporator is conventional and employs a container 50 having a lower compartment 51 and an upper compartment 52. The pipe 16 is led to the expansion valve 17, and the liquefied petroleum gas expands into compartment 51. Leading from compartment 51 to compartment 52 is a plurality of vertically disposed pipes 53 through which the expanding liquid passes upwardly into vapor compartment 52. The evaporator shown in Figure 2, is what is known as the header type of evaporator, and it is evident that the vertical pipes 53 are suitably finned by a plurality of fins 54 which is conventional such as that employed in automobile radiators, or such as employed in commercial refrigeration units. In this case, the liquid fuel would enter the compartment 51 through pipe 16, and after passing conventional expansion valve 17 would fill compartment 51, and pass upwardly through the pipes 53, and would be converted into a vapor by the time it reached compartment 52. The vapor would pass out through pipe 33a. If a wet type of evaporator were used, a suitable thermostatically operated expansion valve could be employed which would be controlled by a thermostatic bulb 55, suitably connected by a conventional means 56, such as by a suitable capillary tube for controlling the amount of liquid passed by the expansion valve, as when the liquid rose to point 55 the expansion valve would be closed to prevent further entry of the liquid. If desired, a dry type header could be employed which would be identical in all respects to the evaporator shown in Figure 2 except that the thermostatic control would be eliminated, and the conventional back pressure operated expansion valve would be employed.

Instead of the above-described arrangement as to an expansion valve, a suitable manually operated pressure reducing valve, such as a needle valve could be employed.

It can thus be seen that the air which is emanating from supercharger 10 would pass directly into the mixing valve, and through the evaporator. The air heated by the action of the supercharger would be cooled by passing through the evaporator housing, and the vapor fuel produced by the evaporator would be led out of pipe 33a and into the mixing valve branch 32, and thus the vapor being mixed with the air before the mixture reached the evaporator housing, both the air and the vapor, or in other words, the mixture of fuel ready for combustion would be cooled by the evaporator.

The supercharger 10 is usually driven by the exhaust of the engine which is conventional, and therefore, the driving means for the supercharger are not shown.

Wherever in the specification and claims the term "liquefied petroleum gas" or "liquefied petroleum gases" is used, it is intended to cover not only propane, butane, and the like, but any hydrocarbon volatile fuel which is stored in a closed container where a vapor pressure would be present as a result of vaporization of the liquid on account of the temperature to which it would be subjected.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a charge forming device for an internal combustion engine employing liquefied petroleum gas as a fuel, a duct adapted to conduct air to an intake port of the engine, expansion means disposed within the line of draft of the air passing through the duct for converting the liquefied gas into vapor, a mixing valve connected to the duct and to the vapor side of the expansion means, and means for regulating the proportion of the air which is passed through the duct which is subjected to contact with the expansion means.

2. In a charge forming device for an internal combustion engine employing liquefied petroleum gas as a fuel, a duct for conducting air to an intake port of the engine, expansion means disposed within the line of draft of the air passing through the duct for converting the liquefied gas into vapor, a mixing valve connected to the duct and to the vapor side of the expansion means, and means controlled by the temperature of the air after it has passed in contact with the expansion means for regulating the proportion of the air which is passed through the duct which is subjected to contact with the expansion means.

3. In a charge forming device for an internal combustion engine employing liquefied petroleum gas as a fuel, an air duct adapted to have one end connected to an intake port of the engine, an evaporator disposed within the duct, means for conducting the liquid fuel to the evaporator, a mixing valve in the duct, means for conducting the vapor from the evaporator to the mixing valve, and means controlled by the temperature of the air in the duct after it passes the evaporator for controlling the amount of air which contacts the evaporator.

4. In a charge forming device for an internal combustion engine employing liquefied petroleum gas as a fuel, a supercharger, a duct adapted to be led from the supercharger to an intake port of the engine, an expansion coil disposed within said duct, a mixing valve disposed within said duct, means for conducting the liquefied petroleum gas to the expansion means, means for conducting the vapor from the expansion means to the mixing valve, means for by-passing some of the air in the duct around the expansion means and out of contact with the expansion means, and thermo-controlled means in the line of flow of air after it passes the expansion means for controlling the by-passing means.

5. In a charge forming device for an internal combustion engine employing liquefied petroleum gas as a fuel, a supercharger, a mixing valve, a housing, a duct leading from the supercharger to the mixing valve, a second duct leading from the mixing valve to the housing, a third duct adapted to be led from the housing to an intake port of the engine, expansion means disposed within the housing for converting the liquefied petroleum gas into a vapor, means for conducting the vapor from the expansion means to the mixing valve, the air and vapor while passing through the housing being adapted to contact the expansion means to cool the same, a by-pass around said expansion means, and thermo-controlled means disposed in the line of draft of air after it passes the expansion means for by-passing some of the air around said expansion means.

6. In an internal combustion engine employing liquefied petroleum gas as a fuel, expansion means for expanding the liquefied petroleum gas into a vapor, a mixing valve for mixing air with the vapor before it enters the engine, an air duct for directing air through the mixing valve on its way to the engine, the expansion means being disposed within said duct and exposed to the air passing through the duct, and selectively operable means for heating the expansion means to assist in vaporization of the liquid fuel.

7. In a charge forming device for an internal combustion engine employing liquefied petroleum gas as a fuel, an air duct adapted to have one end connected to an intake port of the engine and having its other end open to the atmosphere, expansion means disposed within the duct, and washed by the air passing through the duct for converting the liquefied petroleum gas into a vapor, a mixing valve in said duct, means for conducting vapor from the expansion means to said mixing valve, and selectively operable means for heating the expansion means to assist in evaporation of the liquid fuel.

8. In a charge forming device for an internal combustion engine employing liquefied petroleum gas as a fuel, an air duct adapted to have one end thereof connected to an intake port of the engine, a supercharger communicating with the other end of the duct, expansion means within the duct, and exposed to the air passing through the duct, for converting by expansion, the liquefied gas into a vapor, a mixing valve in said duct and having connection with the expansion means for mixing the vapor with the air as it travels within the duct on its way to the engine, and selectively operable means for heating the expansion means to assist in evaporation of the liquid fuel.

9. In an internal combustion engine employing liquefied petroleum gas as a fuel, a duct for conducting air to an intake port of the engine, expansion means disposed within the line of draft of the air passing through the duct, for converting the liquefied gas into vapor, a mixing valve connected to the duct and to the vapor side of the expansion means, and means for regulating the proportion of the air which is passed through the duct which is subjected to contact with the expansion means, and selectively operable means for heating the expansion means to assist in evaporation of the liquid fuel.

10. In an internal combustion engine employing liquefied petroleum gas as a fuel, a duct for conducting air to an intake port of the engine, expansion means disposed within the line of draft of the air passing through the duct, for converting the liquefied gas into vapor, a mixing valve connected to the duct and to the vapor side of the expansion means, and means controlled by the temperature of the air after it has passed in contact with the expansion means for regulating the proportion of the air which is passed through the duct which is subjected to contact with the expansion means, and selectively operable means for heating the expansion means to assist in evaporation of the liquid fuel.

11. In an internal combustion engine employing liquefied petroleum gas as a fuel, expansion means for converting the liquid into a vapor, a mixing valve, means for conducting the vapor to the mixing valve, a housing surrounding the expansion means, and means for conducting air, before it enters the engine, through said housing and in contact with the expansion means for employing the refrigerating effect of vaporization of the liquid fuel for cooling the air, and selectively operable means for heating the expansion means to assist in evaporation of the liquid fuel.

12. In an internal combustion engine employing a liquefied petroleum gas fuel, means for expanding the liquid fuel into a gaseous state, a mixing valve for mixing air and the gaseous fuel, means for conducting the gaseous fuel from the expanding means to the mixing valve and means for passing the air past and in contact with the expanding means on its way to and before it enters the mixing valve to thereby cool the air before it is mixed with the gaseous fuel, and selectively operable means for heating the expanding means to assist in evaporation of the liquid fuel.

13. In a charge forming device for an internal combustion engine employing liquefied petroleum gas as a fuel, an air duct for conducting air to an intake port of the engine, an evaporator disposed within the duct, means for conducting the liquid fuel to the evaporator, a mixing valve in the duct, means for conducting the vapor from the evaporator to the mixing valve, and means controlled by the temperature of the air in the duct after it passes the evaporator for controlling the amount of air which contacts the evaporator, and selectively operable means for heating the evaporator to assist in evaporation of the liquid fuel.

14. In a charge forming device for an internal combustion engine employing liquefied petroleum gas as a fuel, a supercharger, a duct leading from the supercharger for conducting air to an intake port of the engine, an expansion coil disposed within said duct, a mixing valve disposed within said duct, means for conducting the liquefied petroleum gas to the expansion means, means for conducting the vapor from the expansion means to the mixing valve, means for by-passing some of the air in the duct around the expansion means and out of contact with the expansion means, and thermo-controlled means in the line of flow of air after it passes the expansion means for controlling the by-passing means, and selectively operable means for heating the expansion means to assist in evaporation of the liquid fuel.

15. In a charge forming device for an internal combustion engine employing liquefied petroleum gas as a fuel, a supercharger, a mixing valve, a housing, a duct leading from the supercharger to the mixing valve, a second duct leading from the mixing valve to the housing, a third duct leading from the housing for conducting air to an intake port of the engine, expansion means disposed within the housing for converting the liquefied petroleum gas into a vapor, means for conducting the vapor from the expansion means to the mixing valve, the air while passing through the housing being adapted to contact the expansion means to cool the air, a by-pass around said expansion means, and thermo-controlled means disposed in the line of draft of air after it passes the expansion means for by-passing some of the air around said expansion means, and selectively operable means for heating the expansion means to assist in evaporation of the liquid fuel.

NELSON M. JONES.